(12) United States Patent
Nagata et al.

(10) Patent No.: US 8,251,293 B2
(45) Date of Patent: Aug. 28, 2012

(54) CARD PROCESSING APPARATUS WITH LIQUID DRAIN

(75) Inventors: Shigeyuki Nagata, Nagano (JP);
Kazunori Takahashi, Nagano (JP)

(73) Assignee: Nidec Sankyo Corporation (JP)

( * ) Notice: Subject to any disclaimer, the term of this patent is extended or adjusted under 35 U.S.C. 154(b) by 262 days.

(21) Appl. No.: 12/020,617

(22) Filed: Jan. 28, 2008

(65) Prior Publication Data
US 2008/0185442 A1 Aug. 7, 2008

(30) Foreign Application Priority Data

Jan. 26, 2007 (JP) ................................. 2007-016924

(51) Int. Cl.
*G06K 13/00* (2006.01)
(52) U.S. Cl. ...................................................... 235/475
(58) Field of Classification Search ................... 235/475
See application file for complete search history.

(56) References Cited

U.S. PATENT DOCUMENTS

| | | | |
|---|---|---|---|
| 5,698,832 A | 12/1997 | Someya et al. | |
| 6,176,426 B1 * | 1/2001 | Kanayama et al. | 235/449 |
| 6,752,367 B2 * | 6/2004 | Yamashita et al. | 248/312 |
| 2004/0129772 A1 * | 7/2004 | Ramachandran et al. | 235/379 |
| 2006/0086793 A1 * | 4/2006 | Oguchi | 235/441 |
| 2007/0034683 A1 * | 2/2007 | Eastman et al. | 235/379 |

FOREIGN PATENT DOCUMENTS

| | | |
|---|---|---|
| JP | 02-27249 U | 2/1990 |
| JP | 04-090085 A | 3/1992 |
| JP | 11-134452 A | 5/1999 |

OTHER PUBLICATIONS

The notice of the reason of the refusal, for Japanese patent application No. 2007-016924 mailing date of Jan. 17, 2012 with partial translation.

* cited by examiner

*Primary Examiner* — Daniel Hess
*Assistant Examiner* — David Tardif
(74) *Attorney, Agent, or Firm* — Cantor Colburn LLP

(57) ABSTRACT

A card apparatus for use with a card may include a front bezel, a cart inlet slot placed in the front bezel, a card path continuously extending from the card inlet slot, a shutter installed between the card inlet slot and the card path for opening and closing the card path, a case body closely contacting the front bezel and internally including the card path, a tilted part that is tilted so as to become further away gradually from the card path in a direction from an inner part of the case body toward the front bezel to guide a liquid infiltrated through the card inlet slot, and liquid drain holes positioned at the front side of the front bezel to go through continuously to a side of the case body for draining the liquid.

3 Claims, 3 Drawing Sheets

CARD PROCESSING APPARATUS WITH LIQUID DRAIN

CROSS REFERENCE TO RELATED APPLICATIONS

The present invention claims priority under 35 U.S.C. §119 to Japanese Application No. 2007-016924 filed Jan. 26, 2007, which is incorporated herein by reference and priority to which is hereby claimed.

FIELD OF THE INVENTION

The present invention relates to a card processing apparatus that takes in a card such as a magnetic card, and then reads and writes information data from/to the card.

BACKGROUND OF THE INVENTION

Magnetic cards and IC cards are generally used, for example at banking facilities and automatic vending machines, as cards for implementation of personal verification and cashless service. A magnetic card includes magnetic stripes formed on a surface of a plastic substrate, and an IC card includes an IC chip embedded in a plastic substrate. Reading and writing information data from/to these cards is carried out by a card processing apparatus (a card reader) equipped with a magnetic head and/or an IC contact. The card processing apparatus is usually mounted, for example, on a higher-level device (or a panel of the higher-level device) such as an automatic vending machine.

Thus, according to requirements for a security-compatible card reader (in compliance with PCI-PED standards), an entire part of the card reader needs to be covered with a tamper-resistant case for the purpose of prevention of any tampering access. Also, from a viewpoint of environment-resistance such as dust-proof and waterproof, it is needed to cover the card reader with such a tamper-resistant case. For example, in the case of a card reader disclosed by Patent Document 1, a tamper-resistant case is placed in order to cover various elements including a circuit board (an electronic circuit plate 7 in Patent Document 1).

PATENT DOCUMENT 1

Specification of U.S. Pat. No. 5,698,832

In a case where the card reader is used in an outdoor environment (for example, being mounted at an automatic vending machine), it is required to prevent the card reader devices from any failure resulting from rainwater infiltrated through a card inlet slot. However, the card reader equipped with the case described above (tamper-resistant case) may not enable prevention of the problem of such failure. Furthermore, even when it is possible to prevent the card reader devices from any such failure, the card reader may impair convenience performance.

For example, a cover member (a hood, etc.) may be placed around the card inlet slot to prevent any rainwater infiltration. However, for such an arrangement, the cover member itself is additionally required so as to cause an increase of production cost. Furthermore, when a card is handled, the cover member needs to be opened and closed so as to worsen operation performance and impair convenience performance. Moreover, despite the cover member being used; once rainwater has infiltrated through the card inlet slot, the rainwater gets accumulated inside the case and the accumulated rainwater may cause malfunction of the card reader devices.

SUMMARY OF THE INVENTION

At least an embodiment of the present invention may provide a card processing apparatus that, even being a card processing apparatus equipped with a case, can avoid deterioration of convenience performance and prevent any water accumulation inside the case and consequently decrease a failure rate.

To solve the problem identified above, at least an embodiment of the present invention may include the following structure.

(1) A card processing apparatus including: a front bezel, a card inlet slot placed in the front bezel, a card path continuously extending from the card inlet slot, a shutter installed between the card inlet slot and the card path for opening and closing the card path, a case body closely contacting the front bezel and internally including the card path, a tilted part that is tilted so as to become further away gradually from the card path in a direction from an inner part of the case body toward the front bezel to guide a liquid infiltrated through the card inlet slot, and liquid drain holes positioned at the front side of the front bezel to go through continuously to a side of the case body for draining the liquid.

According to at least an embodiment of the present invention, the card processing apparatus may include: the front bezel, the card inlet slot, the shutter installed between the card inlet slot and the card path, the case body internally including the card path, the tilted part that is tilted so as to become further away gradually from the card path in the direction from the inner part of the case body toward the front bezel to guide the liquid infiltrated through the card inlet slot, and the liquid drain holes positioned at the front side of the front bezel to go through continuously to the side of the case body for draining the liquid. Therefore, the card processing apparatus according to at least an embodiment of the invention enables decrease in a failure rate while avoiding deterioration of convenience performance.

In other words; even if water comes into the case, for example, through the card inlet slot, the water can be drained through the tilted part and the liquid drain holes. Therefore, this arrangement enables decrease in a rate of failure due to water accumulation inside the case. Furthermore, since rainwater and so on infiltrated into the case can be drained afterward, it is not needed to install any cover member that requires opening and closing operations. Therefore, this arrangement enables prevention of deterioration of convenience performance, such as worsening card operation performance.

Moreover, since the tilted part is tilted so as to become further away gradually from the card path in the direction from the inner part of the case body toward the front bezel, it is not needed to tilt an entire part of the card processing apparatus in an obliquely front-downward direction (Tilting the card processing apparatus in an obliquely front-downward direction brings difficulty for inserting the card into the card inlet slot and worsens card operation performance). Therefore, this arrangement enables prevention of deterioration of convenience performance, such as worsening card operation performance.

(2) The card processing apparatus may further include a card processing section located at an inner side of the card path for reading and writing information data recorded in the card.

According to at least an embodiment of the present invention, the card processing apparatus may include the card processing section (such as an IC contact) located at the inner side of the card path for reading and writing information data recorded in the card. Therefore, malfunction of the card reader devices can effectively be avoided.

Namely, structural elements according to at least an embodiment of the present invention may include not only the tilted part and the liquid drain holes but also the shutter placed between the card inlet slot and the card path. Therefore, even though rainwater and so on get infiltrated into the case, the rainwater and so on are unlikely to reach an inner side of the card path as far as the shutter is closed. Thus, by locating the card processing section at the card path, it becomes possible more surely to prevent malfunction of the card reader devices (for example, failure due to short-circuiting of the IC contact protruded to the card path).

(3) The card processing apparatus, wherein the card path is so placed as to have the card inserted in a horizontal direction from the card inlet slot, and a control circuit board for controlling the card processing apparatus is located at a position higher than the card path.

According to at least an embodiment of the present invention, the card path may be placed so as to have the card inserted in the horizontal direction from the card inlet slot, and the control circuit board for controlling the card processing apparatus is located at the position higher than the card path. Therefore, even if water passes through the shutter to get infiltrated into the card path (for example, a drenched card is inserted), the water drops to the tilted part. Then, the control circuit board is unlikely to get drenched, and it becomes possible more surely to prevent malfunction of the card reader devices.

(4) The card processing apparatus, wherein a breaking-in protection member working for preventing any foreign material breaking in through the liquid drain holes is placed at the card processing apparatus' inner side of the liquid drain holes.

According to at least an embodiment of the present invention, the breaking-in protection member (for example, a metallic plate) working for preventing any foreign material breaking in through the liquid drain holes is placed at the card processing apparatus' inner side of the liquid drain holes. Therefore, even if a stick is recklessly poked into the liquid drain holes, this arrangement can prevent damages of internals of the card processing apparatus (for example, internals of the tilted part).

Equipped with a case, a card processing apparatus relating to at least an embodiment of the present invention may makes it possible to prevent any water being accumulated in the case and to keep devices of the card processing apparatus from failure while convenience performance of the devices being taken into consideration.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE PREFERRED EMBODIMENT

At least an embodiment of the present invention is described below with reference to the accompanying drawings.

Mechanical Structure

Figure 1:
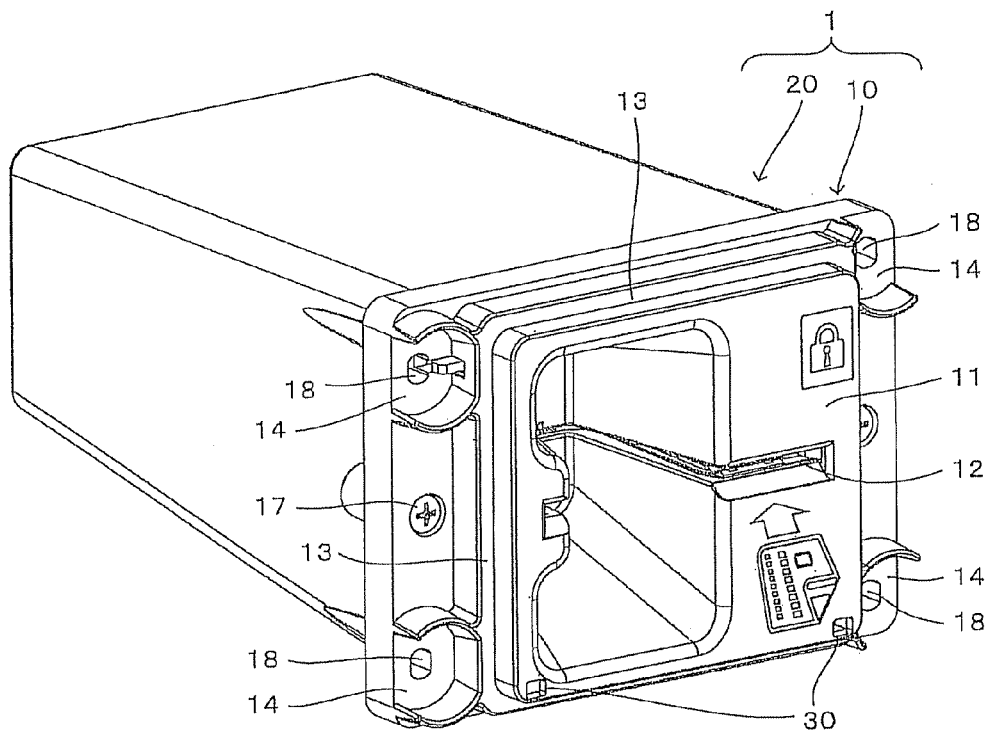
FIG. 1 is a perspective view showing an external structural view of a card reader relating to at least an embodiment of the present invention.
Figure 2:
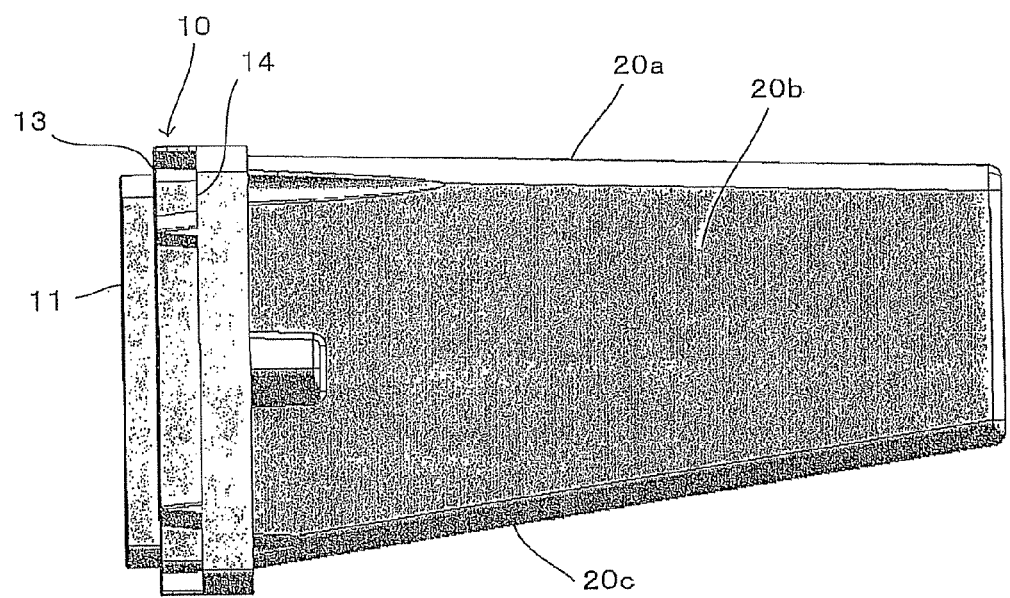
FIG. 2 is a side view of the card reader shown in FIG. 1.

FIG. 1 is a perspective view showing an external structural view of a card reader 1 relating to at least an embodiment of the present invention. FIG. 2 is a side view of the card reader 1 shown in FIG. 1. Though the card reader 1 shown in FIG. 1 is applied as a card processing apparatus in the present embodiment, at least an embodiment of the present invention can also be applied to other kinds of card readers.

In FIG. 1 and FIG. 2, the card reader 1 includes a front bezel 10 having a front face 11 and a card inlet slot 12, both of which expose themselves from an opening of a panel of a higher-level device; a card path 21 (Refer to FIG. 4 to be explained later) extending from the card inlet slot 12; and a case body 20 closely contacting the front bezel 10 and having the card path 21 internally. The case body 20 is assembled to the front bezel 10 with screws 17.

Formed in the front bezel 10 are a circumferential contacting surface 13 that contacts the panel of the higher-level device (not illustrated), and fixing surfaces 14 that contact protrusions located at a rear side (a side toward the higher-level device) of the panel. Four fixing surfaces 14 are formed at four corners of the front bezel 10, and accordingly there are also 4 protrusions located at the rear side of the panel of the higher-level device. The front face 11, the circumferential contacting surface 13, and the fixing surfaces 14 are formed in a step structure in a direction toward an inside of the higher-level device. As a result, only the front face 11 can be seen externally through the panel.

As shown in FIG. 2, the case body 20 includes a top wall 20a, a side wall 20b, and a bottom wall 20c. When the card reader 1 is installed into the upper-level device so as to have a card inserted in a horizontal direction, the bottom wall 20c is tilted for about 10 degrees. Namely, in a direction from an inner part of the case body 20 toward the front bezel 10, the bottom wall 20c is tilted so as to become further away gradually from the card path 21. This arrangement leads a liquid infiltrated through the card inlet slot to the front bezel 10. Thus, in the present embodiment, the bottom wall 20c works as "a tilted part". Incidentally, the card reader 1 is fixed with screws to the panel of the higher-level device by using mounting holes 18.

The card reader 1 relating to the present embodiment is equipped with liquid drain holes 30 that are located at (a lower section of) a front surface of the front bezel 10 and go through to a side of the case body 20 for draining the liquid. Since these drain holes are placed, any rainwater and so on can be drained afterward even if such a liquid once infiltrates through card inlet slot 12 into the case body 20. Described below in detail with reference to FIG. 3 through FIG. 5 is a way of draining the liquid through the liquid drain holes 30.

Figure 3:
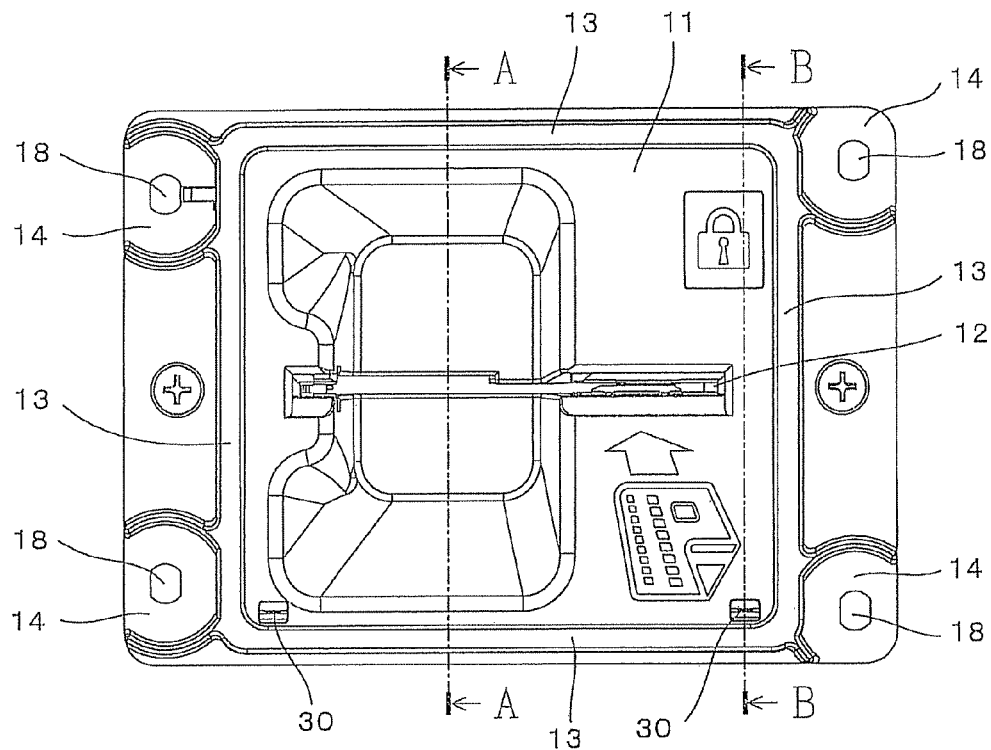
FIG. 3 is a front elevation view of the card reader relating to at least an embodiment of the present invention.

FIG. 3 is a front elevation view of the card reader 1 relating to at least an embodiment of the present invention. FIG. 4 is a cross sectional view of the card reader 1 shown in FIG. 3, taken along the line A-A in the figure. FIG. 5 is a cross sectional view of the card reader 1 shown in FIG. 3, taken along the line B-B in the figure.

Figure 4:
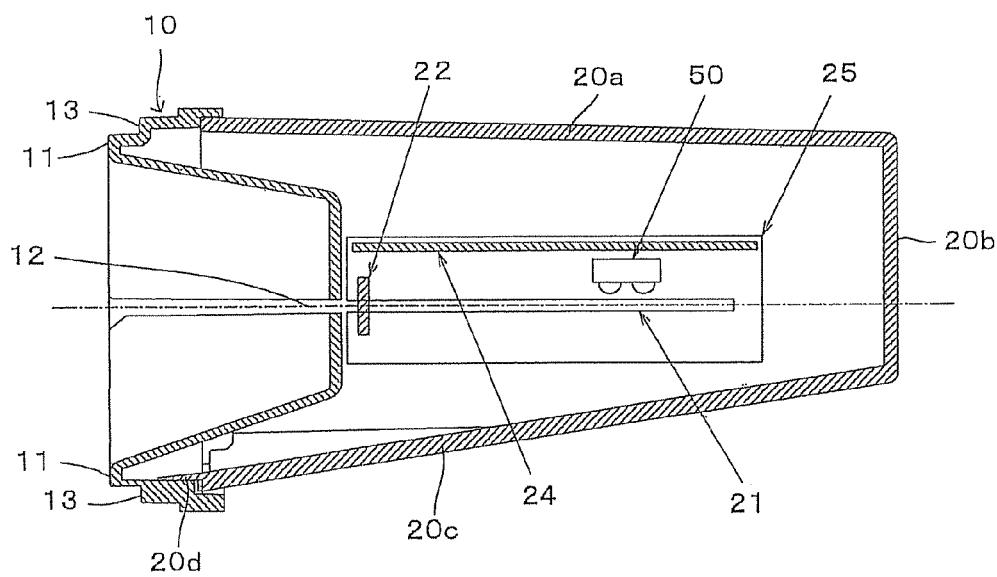
FIG. 4 is a cross sectional view of the card reader shown in FIG. 3, taken along the line A-A in the figure.
Figure 5:
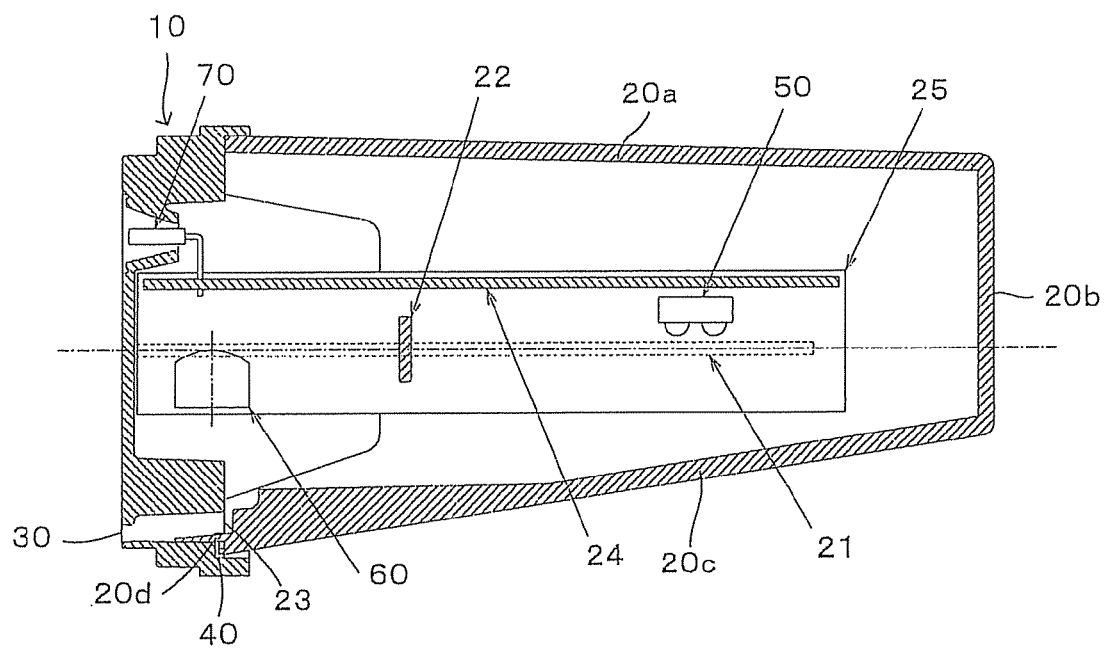
FIG. 5 is a cross sectional view of the card reader shown in FIG. 3, taken along the line B-B in the figure.

As FIG. 4 shows, the card path 21 described above continuously extends from the card inlet slot 12. Furthermore, placed at an inner side of the card path 21 so as to face the card path 21 is a card processing section 25 that reads and writes information data from/to a card. The card processing section 25 includes, for example, a magnetic head 60 and an IC contact 50. The card path 21 is so placed as to have a card inserted horizontally from the card inlet slot 12 when the card reader 1 is installed horizontally. Then, a control circuit board 24 for controlling the card reader 1 is positioned over the card path 21 that is placed as described above. In the present embodiment, the card reader 1 is sealed with the case body 20, and there is a hollow section between a lower side of the card path 21 and the case body 20. Accordingly, there is a chance that water infiltrated into the card path 21 passes through the hollow section to drop to the bottom wall 20c of the case body 20.

Furthermore, placed between the card inlet slot 12 and the card path 21 is a shutter 22 that opens and closes the card path 21. The shutter 22 is so pressed in a direction as to close the card path 21 by a shutter returning spring. When a card inserted through the card inlet slot 12 arrives at the shutter 22, the shutter 22 gets opened by the card. Meanwhile, once the inserted card is pulled out, the shutter 22 gets closed by the shutter returning spring at the time when the card gets out of the shutter 22. In the present embodiment, a full-range shutter that covers a full extent of the card path 21 is used as the shutter.

As shown in FIG. 4 and FIG. 5, a rib 20d is formed at an edge (a front end) of the bottom wall 20c of the case body 20, and the rib 20d prevents any water leakage at a connection part between the bottom wall 20c and the front bezel 10. In other words, at the connection part between the front bezel 10 and the bottom wall 20c, the rib 20d is extended from the case body 20 for overlapping so that the infiltrated water is guided to the liquid drain holes 30 more surely and this arrangement also prevents any water infiltration from the connection part due to backwater. Furthermore, in the card reader 1 relating to the present embodiment, as shown in FIG. 5, a sealing member 40 (a packing) made of sponge, rubber, or any equivalent is placed at a lower part of the connection part between the bottom wall 20c and the front bezel 10 to prevent any water infiltration through the connection part more surely.

At the card processing apparatus' inner side of the liquid drain holes 30, a metallic plate 23 is installed at a root side of the rib 20d in a direction perpendicular to the card insertion direction. The metallic plate 23 is as an example of a breaking-in protection member working for preventing any foreign material breaking in through the liquid drain holes 30. Incidentally, the metallic plate 23 made of metal is used in this embodiment as the member for preventing any foreign material, but the material of the metallic plate 23 is not limited to metal and any other material can be used. Additionally, as seen in FIG. 5, the apparatus may also include a display LED 70.

Advantageous Effect of the Embodiment

As described above, according to the card reader 1 described above including the case body 20, the bottom wall 20c of the case body 20 is tilted. Therefore, water infiltrated into the case body 20 can be drained externally through the liquid drain holes 30 (Since no drain tube is used, this arrangement enables a manufacturing process to be simplified and production costs to be reduced).

Furthermore, when the card reader 1 is installed into the higher-level device, it is not required to tilt an entire part of the card reader 1 (a unit) in an obliquely frontward direction. Therefore, this arrangement can prevent card operation performance from worsening, such as card insertion into the card inlet slot 12 becoming difficult.

Moreover, since the card reader 1 is equipped with the shutter 22 to open and close the card path 21, the card processing section 25 placed so as to face the card path 21 is unlikely to get drenched or damaged while the shutter 22 is closed. In other words, most of water or foreign material infiltrated through the card inlet slot 12 is blocked at the shutter 22 and the blocked water or foreign material drops to the bottom wall 20c of the case body 20. Then, the dropped water or foreign material flows along the bottom wall 20c to the front bezel 10, and eventually drains off externally through the liquid drain holes 30. Thus, this arrangement prevents malfunction of the card reader devices including the IC contact 50 more surely.

Still further, even in a case where water have passed through the shutter 22 to infiltrate into the card path 21, the control circuit board 24 is unlikely to get drenched since the control circuit board 24 for controlling the card reader 1 is located at a position higher than the card path 21 as shown in FIG. 4 and FIG. 5. Thus, this arrangement prevents malfunction of the card reader devices more surely.

Since the metallic plate 23 is installed at the root side of the rib 20d, the metallic plate 23 can prevent a stick from reaching the bottom wall 20c even if the stick is poked through the liquid drain holes 30, so that this arrangement can prevent damages of internals of the card processing apparatus.

Furthermore, in the present embodiment, size of the liquid drain holes 30 is set to be greater than size of all gaps which may cause water infiltration, including a gap between the front bezel 10 and a main body of the card reader 1, and so on. Therefore, water infiltrated into the case body 20 can effectively be drained externally through the liquid drain holes 30.

Industrial Applicability

The card processing apparatus relating to at least an embodiment of the present invention is useful for enabling prevention of water accumulation inside a case, even if the card processing apparatus is equipped with the case, while avoiding deterioration of convenience performance.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card processing apparatus for use with a card, the card processing apparatus comprising:
    a front bezel;
    a card inlet slot placed in the front bezel;
    a card path continuously extending from the card inlet slot in a horizontal direction;
    a shutter installed between the card inlet slot and the card path for opening and closing the card path;
    a case body closely contacting the front bezel and internally including the card path, the case body including a tilted part that is tilted so as to become further away gradually from the card path in a direction from an inner part of the case body toward the front bezel and so as to extend to the front side with respect to the shutter to guide a liquid infiltrated through the card inlet slot;

a hollow section provided at least under the shutter between the card path and the tilted part so that liquid infiltrated through the card inlet slot is blocked by the shutter and is prevented from entering into an inside of the card processing apparatus through the card path by the shutter; and liquid drain holes positioned at the front side of the front bezel to go through continuously to a side of the case body for draining the liquid, the liquid drain holes being disposed on the front side with respect to the shutter;

wherein the card path is so placed as to have the card inserted in a horizontal direction from the card inlet slot;

a control circuit board for controlling the card processing apparatus is located above the card path; and the shutter is a full-range shutter that covers a full extent of the card path and is structured to block foreign material from entering the card path; and the shutter is configured to block liquid infiltrated through the card inlet slot, and the tilted part and the hollow section are configured such that the blocked liquid directly drops to the tilted part through the hollow section without entering into the inside of the card processing apparatus through the card path extended in the horizontal direction and flows along the tilted part to the front side to the liquid drain hole of the front bezel.

2. The card processing apparatus according to claim 1 further comprising:

a card processing section located at an inner side of the card path for reading and writing information data recorded in the card.

3. The card processing apparatus according to claim 1:

wherein a breaking-in protection member structured to prevent foreign material breaking in through the liquid drain holes is placed at an inner side of the liquid drain holes.

* * * * *